United States Patent
Mills

(10) Patent No.: US 6,467,779 B1
(45) Date of Patent: Oct. 22, 2002

(54) COMBINATION ICE COOLER AND FISHING ROD HOLDER

(76) Inventor: Errol L. Mills, 7729 Caoba Ct., Lake Worth, FL (US) 33467

( * ) Notice: Subject to any disclaimer, the term of this patent is extended or adjusted under 35 U.S.C. 154(b) by 27 days.

(21) Appl. No.: 09/697,972

(22) Filed: Oct. 26, 2000

(51) Int. Cl.⁷ .............................. B62B 1/04; B62B 1/00
(52) U.S. Cl. ...................... 280/47.26; 280/30; 224/922
(58) Field of Search .................... 280/47.35, 47.19, 280/47.26, 47.24, 47.25, 47.29, 47.37, 30, 38, 655, 655.1; D7/605; D34/12, 17, 19, 20, 21, 24, 25, 26; 43/54.1; 62/457.1, 457.7, 464; 220/592.03, 592.2; 190/18 A, 39, 115; 224/576, 651, 652, 922; 16/900, 408, 409, 410

(56) References Cited

U.S. PATENT DOCUMENTS

| | | | |
|---|---|---|---|
| 4,355,818 A | * | 10/1982 | Watts .......................... 280/654 |
| 4,541,539 A | | 9/1985 | Matthews |
| 4,845,881 A | * | 7/1989 | Ward .......................... 43/21.2 |
| 4,846,493 A | | 7/1989 | Mason |
| D322,198 S | | 12/1991 | Dringenburg |
| D328,221 S | * | 7/1992 | Piccarillo ..................... D7/605 |
| 5,159,777 A | | 11/1992 | Gonzalez |
| 5,313,817 A | | 5/1994 | Meinders |
| 5,471,779 A | * | 12/1995 | Downey ..................... 43/54.1 |
| D378,456 S | | 3/1997 | Speicher |
| 5,803,472 A | * | 9/1998 | Lien ......................... 280/47.26 |
| 6,185,860 B1 | * | 2/2001 | Thibodeaux ................ 43/54.1 |
| 6,237,765 B1 | * | 5/2001 | Hagen et al. .......... 206/315.11 |
| 6,311,991 B1 | * | 11/2001 | Conrado et al. ......... 280/47.26 |

* cited by examiner

Primary Examiner—Brian L. Johnson
Assistant Examiner—G B Klebe

(57) ABSTRACT

A combination ice cooler and fishing rod holder for use when fishing. The combination ice cooler and fishing rod holder includes a main member and a plurality of fishing rod holders. The main member includes a top portion, a bottom portion, a front portion, a back portion and a pair of side portions. The main member forms an interior chamber that is used for storing items to be kept cool. The top portion of the main member is selectively removable from the main member for allowing access to the interior chamber of the main member. The plurality of generally tubular fishing rod holders are coupled to the main member adjacent an associated side portion. Each fishing rod holder is designed for holding fishing rods.

14 Claims, 4 Drawing Sheets

COMBINATION ICE COOLER AND FISHING ROD HOLDER

BACKGROUND OF THE INVENTION

1. Field of the Invention

The present invention relates to ice coolers and more particularly pertains to a new combination ice cooler and fishing rod holder for use when fishing.

2. Description of the Prior Art

The use of ice coolers is known in the prior art. More specifically, ice coolers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,846,493; 4,541,539; 5,313,817; 5,159,777; U.S. Pat. No. Des. 322,198; and U.S. Pat. No. Des. 378,456.

While these devices fulfill their respective, particular objectives and requirements, the aforementioned patents do not disclose a new combination ice cooler and fishing rod holder. The inventive device includes a main member and a plurality of fishing rod holders. The main member includes a top portion, a bottom portion, a front portion, a back portion and a pair of side portions. The main member forms an interior chamber that is used for storing items to be kept cool. The top portion of the main member is selectively removable from the main member for allowing access to the interior chamber of the main member. The plurality of generally tubular fishing rod holders are coupled to the main member adjacent an associated side portion. Each fishing rod holder is designed for holding fishing rods.

In these respects, the combination ice cooler and fishing rod holder according to the present invention substantially departs from the conventional concepts and designs of the prior art, and in so doing provides an apparatus primarily developed for the purpose of use when fishing.

SUMMARY OF THE INVENTION

In view of the foregoing disadvantages inherent in the known types of ice coolers now present in the prior art, the present invention provides a new combination ice cooler and fishing rod holder construction wherein the same can be utilized for use when fishing.

The general purpose of the present invention, which will be described subsequently in greater detail, is to provide a new combination ice cooler and fishing rod holder apparatus and method which has many of the advantages of the ice coolers mentioned heretofore and many novel features that result in a new combination ice cooler and fishing rod holder which is not anticipated, rendered obvious, suggested, or even implied by any of the prior art ice coolers, either alone or in any combination thereof.

To attain this, the present invention generally comprises a main member and a plurality of fishing rod holders. The main member includes a top portion, a bottom portion, a front portion, a back portion and a pair of side portions. The main member forms an interior chamber that is used for storing items to be kept cool. The top portion of the main member is selectively removable from the main member for allowing access to the interior chamber of the main member. The plurality of generally tubular fishing rod holders are coupled to the main member adjacent an associated side portion. Each fishing rod holder is designed for holding fishing rods.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new combination ice cooler and fishing rod holder apparatus and method which has many of the advantages of the ice coolers mentioned heretofore and many novel features that result in a new combination ice cooler and fishing rod holder which is not anticipated, rendered obvious, suggested, or even implied by any of the prior art ice coolers, either alone or in any combination thereof.

It is another object of the present invention to provide a new combination ice cooler and fishing rod holder that may be easily and efficiently manufactured and marketed.

It is a further object of the present invention to provide a new combination ice cooler and fishing rod holder that is of a durable and reliable construction.

An even further object of the present invention is to provide a new combination ice cooler and fishing rod holder that is susceptible of a low cost of manufacture with regard to both materials and labor, and which accordingly is then susceptible of low prices of sale to the consuming public, thereby making such combination ice cooler and fishing rod holder economically available to the buying public.

Still yet another object of the present invention is to provide a new combination ice cooler and fishing rod holder which provides in the apparatuses and methods of the prior art some of the advantages thereof, while simultaneously overcoming some of the disadvantages normally associated therewith.

Still another object of the present invention is to provide a new combination ice cooler and fishing rod holder for use when fishing.

Yet another object of the present invention is to provide a new combination ice cooler and fishing rod holder which includes a main member and a plurality of fishing rod holders. The main member includes a top portion, a bottom portion, a front portion, a back portion and a pair of side portions. The main member forms an interior chamber that is used for storing items to be kept cool. The top portion of the main member is selectively removable from the main member for allowing access to the interior chamber of the main member. The plurality of generally tubular fishing rod holders are coupled to the main member adjacent an associated side portion. Each fishing rod holder is designed for holding fishing rods.

Still yet another object of the present invention is to provide a new combination ice cooler and fishing rod holder that is easy to use.

Even still another object of the present invention is to provide a new combination ice cooler and fishing rod holder that keeps catch cool.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
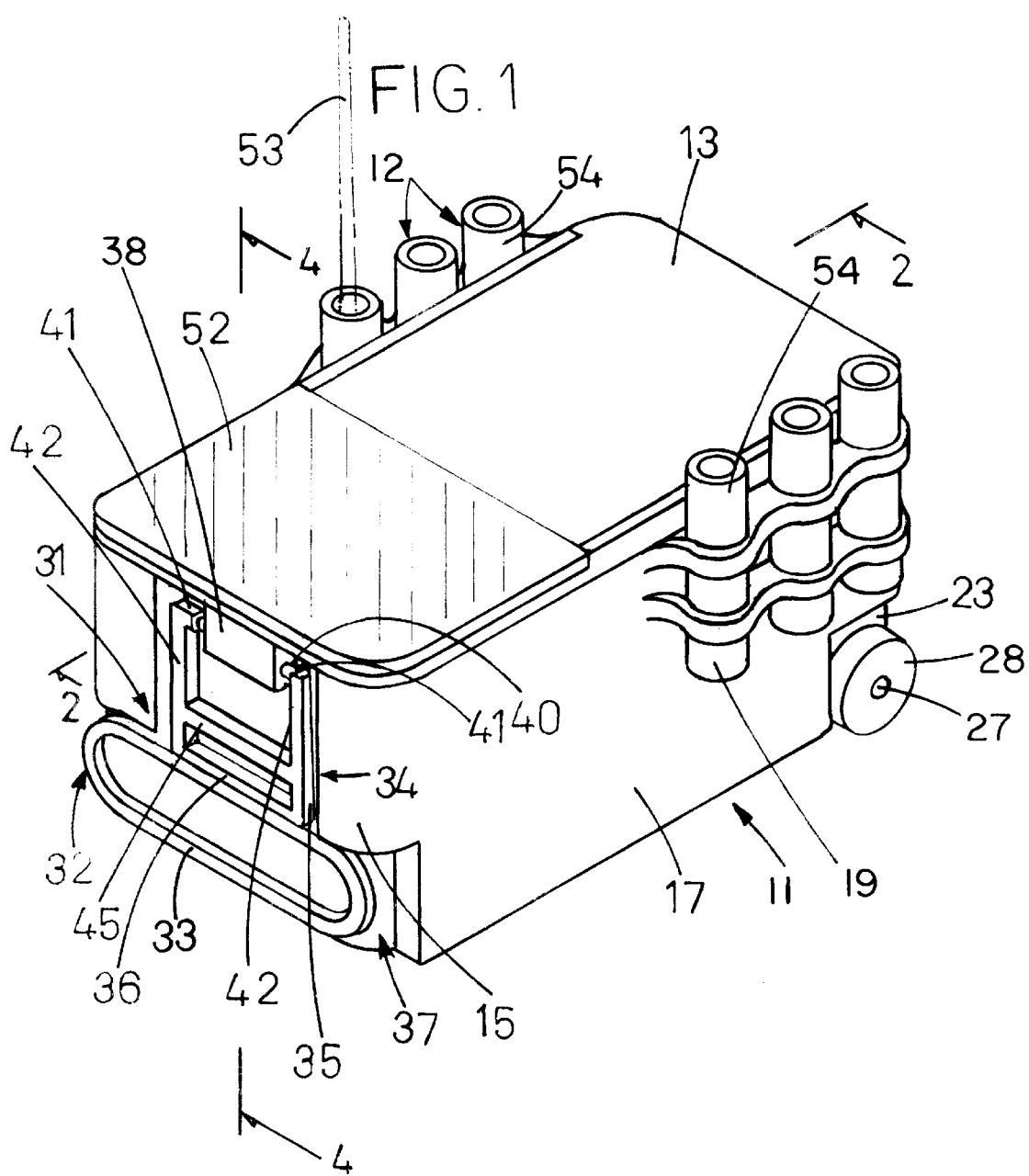
FIG. 1 is a schematic perspective view of a new combination ice cooler and fishing rod holder according to the present invention.
Figure 2:
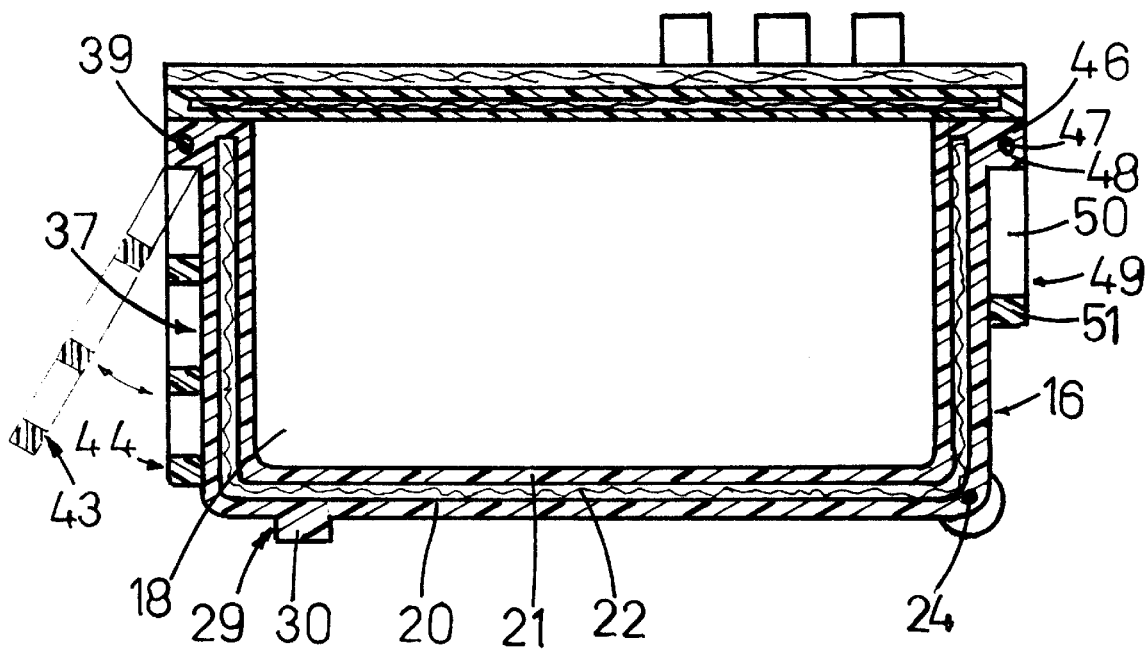
FIG. 2 is a schematic cross sectional side view of the present invention.
Figure 3:
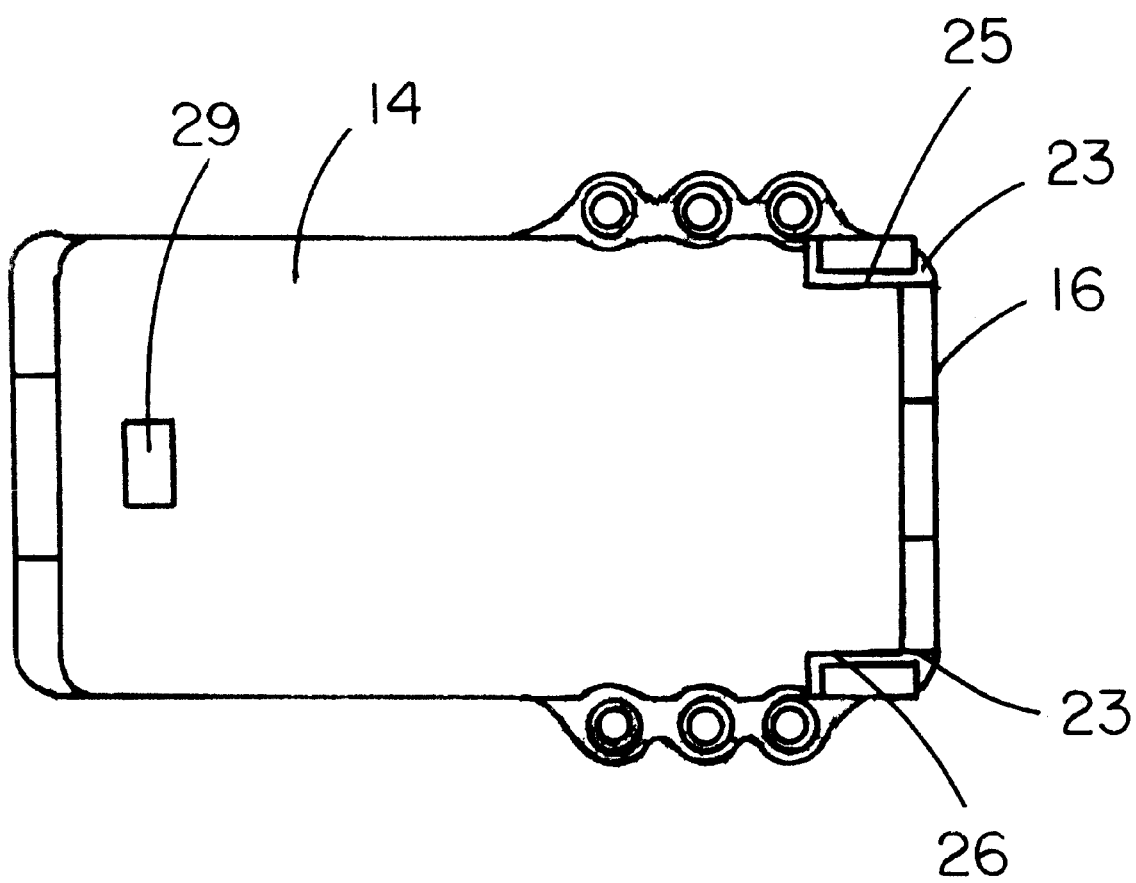
FIG. 3 is a schematic bottom view of the present invention.
Figure 4:
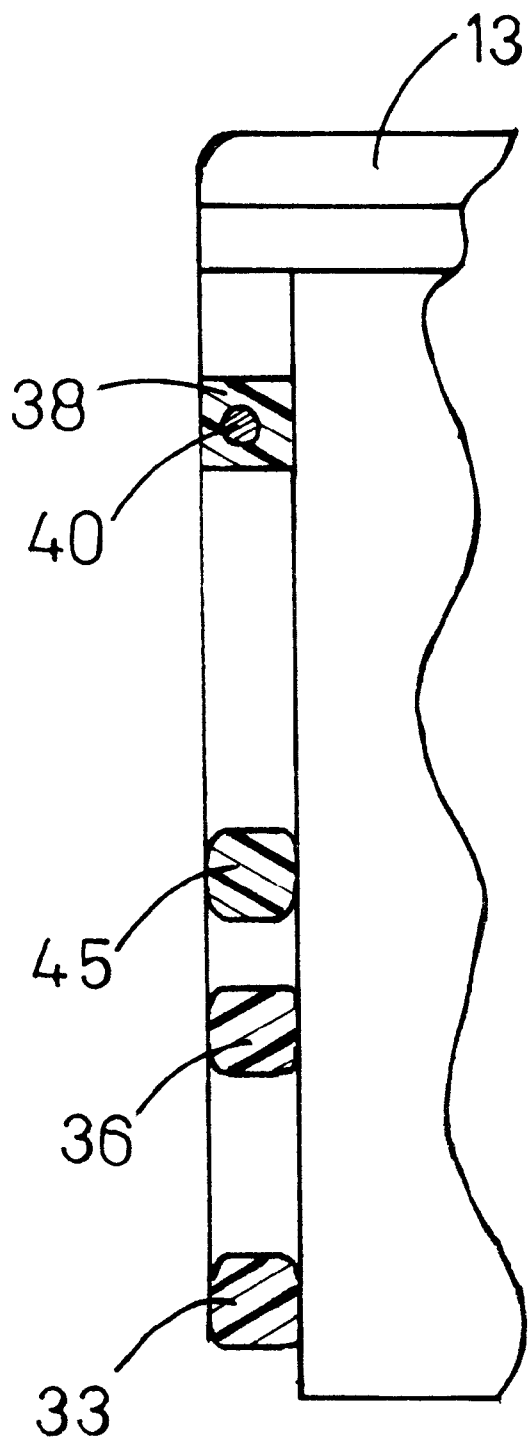
FIG. 4 is a schematic cross-sectional view of the pull handle of the present invention.

With reference now to the drawings, and in particular to FIGS. 1 through 4 thereof, a new combination ice cooler and fishing rod holder embodying the principles and concepts of the present invention and generally designated by the reference numeral 10 will be described.

As best illustrated in FIGS. 1 through 4, the combination ice cooler and fishing rod holder 10 generally comprises a generally rectangular box shaped main member 11 and a plurality of generally tubular fishing rod holders 12. The main member 11 includes a top portion 13, a bottom portion 14, a front portion 15, a back portion 16 and a pair of side portions 17. The main member 11 forms an interior chamber 18 that is used for storing items to be kept cool. The top portion 13 of the main member 11 is selectively removable from the main member 11 for allowing access to the interior chamber 18 of the main member 11. The plurality of fishing rod holders 12 are coupled to the main member 11 adjacent an associated side portion 17. Each fishing rod holder 12 is designed for holding a fishing rod 53.

In closer detail, each fishing rod holder 12 is coupled to the main member 11 proximate the back portion 16 of the main member 11. In addition, each fishing rod holder 12 has an upper portion 54. The upper portion 54 of each fishing rod holder 12 is positioned to extend beyond the top portion 13 of the main member 11. Moreover, each fishing rod holder 12 has a lower portion 19. Each lower portion 19 of each fishing rod holder 12 is encased in an associated side portion 17.

The main member 11 includes an outside surface 20, an inside surface 21 and a medial portion 22. The medial portion 22 is positioned between the outside surface 20 and the inside surface 21. The medial portion 22 of the main member 11 is made of a material that provides insulation to help keep the internal chamber 18 of the main member 11 cool.

Each side portion 17 of the main member 11 has a wheel depression 23. Each wheel depression 23 is positioned adjacent the back portion 16. Each wheel depression 23 is also position adjacent the bottom portion 14. Moreover, the wheel depressions 23 are aligned with each other across a width of the main member 11.

The main member 11 also has an axle bore 24. The axle bore 24 extends from an inside surface 25 of one the wheel depressions 23 to an inside surface 26 of the other wheel depression 23. The main member 11 further has an axle rod 27. The axle rod 27 has a length longer than a length of the axle bore 24. Moreover, the axle rod 27 has a diameter slightly less than a diameter of the axle bore 24. The axle rod 27 is rotatably received in the axle bore 24. A pair of wheels 28 are coupled to an associated distal end of the axle rod. Thus, the wheels 28 may move the main member 11.

Moreover, the main member 11 has a foot rest 29. The foot rest 29 extends from the bottom portion 14 of the main member 11 proximate the front portion 15 of the main member 11. The foot rest 29 is further positioned along a longitudinal axis of the bottom portion 14 of the main member 11. The foot rest 29 further has a distal end 30 that is designed to abut a support surface upon which the foot rest 29 is placed. Thus the foot rest 29 and the wheels support the main member 11 when the main member 11 is placed on a support surface.

A pull handle 31 is used for pulling the main member 11. The pull handle 31 has a generally elliptical grasping portion 32. The grasping portion 32 has a first side 33 that is designed to facilitate pulling the main member 11. The pull handle 31 further has a lifting portion 34. The lifting portion 34 of the pull handle 31 is generally H-shaped. The lifting portion 34 has a first end 35. The first end 35 of the lifting portion 34 is coupled to a second side 36 of the grasping portion 32.

The front portion 15 of the main member has a handle depression 37. The handle depression 37 is designed to receive the pull handle 31. The handle depression 37 has a medial axis that is aligned with a medial axis of the front portion 15 of the main member 11. The front portion 15 of the main member 11 further has a first connection portion 38 that extends out from the handle depression 37. The first connection portion 38 is positioned adjacent the top portion 13 of the main member 11. The first connection portion 38 further has a medial axis that is aligned with the medial axis of the handle depression 37.

The first connection portion 38 has a first connecting bore 39. The first connecting bore 39 extends through a length of the first connection portion 38. A first connecting rod 40 is received in the first connecting bore 39. The first connecting rod 40 has a length that is longer than a length of the first connecting bore 39. Moreover, the first connecting rod 40 further has a diameter slightly less than a diameter of the first connecting bore 39. The first connecting rod 40 is rotatably received in the first connecting bore 39.

The lifting portion 34 of the pull handle 31 has a second end 41. The second end 41 of the lifting portion 34 includes a pair of parallel front arms 42. The first connecting rod 40 is coupled between the front arms 42. Thus the pull handle 31 may rotate about the first connection portion 38. The pull handle 31 has a use position 43 and a storage position 44. The use position 43 is defined when the pull handle 31 is rotated away from the front portion 15 of the main member 11. The storage position 44 is defined when the pull handle 31 is positioned in the handle depression 37.

The lifting portion 34 of the pull handle 31 includes a carrying bar 45 for allowing a user to lift the front portion 15 of the main member 11. The carrying bar 45 extend across the front arms 42 of the lifting portion 34 at a predetermined distance from the first connection portion 38.

The main member 11 further has a second connection portion 46. The second connection portion 46 extends from the back portion 16 of the main member 11. The second connection portion 46 is positioned adjacent the top portion 13 of the main member 11. The second connection portion 46 further has a medial axis aligned with a medial axis of the back portion 16.

The second connection portion 46 has a second connecting bore 47. The second connecting bore 47 extends through a length of the second connection portion 46. A second connecting rod 48 is received in the second connecting bore 47. The second connecting rod 48 has a length longer than a length of the second connecting bore 47 in the second connection portion 46. The second connecting rod 48 further has a diameter slightly less than a diameter of the second connecting bore 47 in the second connection portion 46. The second connecting rod 48 is rotatably received in the second connecting bore 47.

A generally U-shaped back carrying handle 49 is used to lift the back portion 16 of the main member 11. The back carrying handle 49 includes a pair of parallel back arms 50 and a back medial portion 51. The arms extend from the back medial portion 51. Moreover, the back medial portion 51 is designed to facilitate the grasping of the back carrying handle 49. The second connecting rod 48 is coupled between the back arms 50. Thus a user may carry the main member 11 by the carrying bar 45 of the lifting portion 34 of the pull handle 31 and the back carrying handle 49.

The top portion 14 of the main member 11 is adapted to extend over the second connection portion 46 so as to cover the second connection portion 46. The top portion 14 further has an outside seating surface 52 that is designed to allow a user to sit on the top portion 14. The outside seating surface 52 is positioned proximate the front portion 15 of the main member 11 away from the fishing pole holders 12.

In use, the interior chamber 18 of the main member 11 is filled with items to be kept cool. The main member 11 is then carried or pulled to the fishing location. Once at the fishing location, fishing rods 53 are placed in the fishing pole holders 12. When the user desires an item contained in the interior chamber 18, the user removes the top portion 13 of the main member 11. Once the item has been removed, the user replaces the top portion 13. The user may then rest on the outside seating surface 52 of the top portion 14 of the main member 11 while fishing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combination ice cooler and fishing rod holder comprising:

a main member, said main member being defined by a top portion, a bottom portion, a front portion, a back portion and a pair of side portions;

said main member having an interior chamber for storing items to be kept cool;

said top portion of said main member being adapted to be selectively removed from said main member for allowing access to an interior chamber of said main member;

a plurality of generally tubular fishing rod holders adapted for holding fishing rods, each said fishing rod holder being coupled to said main member adjacent an associated said side portion;

a pull handle for pulling said main member, said pull handle having a grasping portion, said grasping portion further having a first side adapted to facilitate the pulling of said main member;

said pull handle further having a lifting portion, said lifting portion of said pull handle being generally H-shaped, said lifting portion having a first end, said first end of said lifting portion being coupled to a second side of said grasping portion;

said front portion of said main member having a handle depression, said handle depression being adapted to receive said pull handle, said handle depression having a medial axis that is aligned with a medial axis of said front portion of said main member;

said front portion of said main member further having a first connection portion extending out from said handle depression, said first connection portion being positioned adjacent said top portion of said main member, said first connection portion further having a medial axis that is aligned with said medial axis of said handle depression;

said first connection portion having a first connecting bore, said first connecting bore extending through a length of said first connection portion;

a first connecting rod, said first connecting rod having a length that is longer than a length of said first connecting bore, said first connecting rod further having a diameter slightly less than a diameter of said first connecting bore, said first connecting rod being rotatably received in said first connecting bore; and said lifting portion of said pull handle having a second end, said second end including a pair of parallel front arms, said first connecting rod being coupled between said front arms wherein said pull handle may rotate about said first connection portion, said pull handle having a use position and a storage position, said use position being defined when said pull handle is rotated away from said front portion of said main member, said storage position being defined when said pull handle is positioned in said handle depression.

2. The combination ice cooler and fishing rod holder of claim 1 wherein said main member is generally rectangular box shaped.

3. The combination ice cooler and fishing rod holder of claim 1 further comprising:

each said fishing rod holder being coupled to said main member proximate said back portion of said main member.

4. The combination ice cooler and fishing rod holder of claim 1 further comprising:

each said fishing rod holder having an upper portion, said upper portion of each said fishing rod holder being positioned to extend beyond said top portion of said main member.

5. The combination ice cooler and fishing rod holder of claim 1 further comprising:

each said fishing rod holder having a lower portion, each said lower portion of each said fishing rod holder being encased in an associated said side portion.

6. The combination ice cooler and fishing rod holder of claim 1 further comprising:

said main member including an outside surface, an inside surface and a medial portion, said medial portion being positioned between said outside surface and said inside surface; and said medial portion of said main member being made of an material that provides insulation.

7. The combination ice cooler and fishing rod holder of claim 1 further comprising:

each said side portion having wheel depression, each said wheel depression being positioned adjacent said back portion, each said wheel depression also being position adjacent said bottom portion wherein said wheel depressions are aligned with each other across said main member;

said main member having an axle bore, said axle bore extending from an inside surface of one said wheel depressions to an inside surface of the other said wheel depressions;

an axle rod, said axle rod having a length longer than a length of said axle bore, said axle rod further having a diameter slightly less than a diameter of said axle bore, said axle rod being rotatably received in said axle bore; and a pair of wheels, each said wheel being coupled to an associate distal end of said axle rod wherein said main member may be moved by said wheels.

8. The combination ice cooler and fishing rod holder of claim 7 further comprising:

a foot rest, said foot rest extending from said bottom portion of said main member proximate said front portion of said main member, said foot rest further being positioned along a longitudinal axis of said bottom portion of said main member, said foot rest further having a distal end adapted to abut a support surface upon which said foot rest is placed wherein said foot rest and said wheels support said main member when said main member is placed on a support surface.

9. The combination ice cooler and fishing rod holder of claim 1 wherein said grasping portion of said pull handle is generally elliptical in shape.

10. The combination ice cooler and fishing rod holder of claim 1 further comprising:

said lifting portion of said pull handle including a carrying bar for allowing a user to lift said front portion of said main member, said carrying bar extending across said front arms of said lifting portion at a predetermined distance from said first connection portion.

11. The combination ice cooler and fishing rod holder of claim 10 further comprising:

a second connection portion, said second connection portion extending from said back portion of said main member, said second connection portion being positioned adjacent said top portion of said main member, said second connection portion further having a medial axis aligned with a medial axis of said back portion;

said second connection portion having a second connecting bore, said second connecting bore extending through a length of said second connection portion;

a second connecting rod, said second connecting rod having a length longer than a length of said second connecting bore in said second connection portion, said second connecting rod having a diameter slightly less than a diameter of said second connecting bore in said second connection portion, said second connecting rod being rotatably received in said second connecting bore; and a generally U-shaped back carrying handle for allowing a user to lift the back portion of said main member, said back carrying handle including a pair of parallel back arms, said second connecting rod being coupled between said back arms wherein a user may carry said main member by said carrying bar of said lifting portion of said pull handle and said back carrying handle.

12. The combination ice cooler and fishing rod holder of claim 11 further comprising:

said top portion of said main member being adapted to extend over said second connection portion.

13. The combination ice cooler and fishing rod holder of claim 1 further comprising:

said top portion further having an outside seating surface adapted for allowing a user to sit on, said outside seating surface being positioned proximate said front portion of said main member.

14. A combination ice cooler and fishing rod holder comprising:

a generally rectangular box shaped main member, said main member being defined by a top portion, a bottom portion, a front portion, a back portion and a pair of side portions;

said main member having an interior chamber for storing items to be kept cool;

said top portion of said main member being adapted to be selectively removed from said main member for allowing access to an interior chamber of said main member;

said top portion further having an outside seating surface adapted for allowing a user to sit on, said outside seating surface being positioned proximate said front portion of said main member;

a plurality of generally tubular fishing rod holders adapted for holding fishing rods, each said fishing rod holder being coupled to said main member adjacent an associated said side portion, each said fishing rod holder further being coupled to said main member proximate said back portion of said main member;

each said fishing rod holder having an upper portion, said upper portion of each said fishing rod holder being positioned to extend beyond said top portion of said main member;

each said fishing rod holder having a lower portion, each said lower portion of each said fishing rod holder being encased in an associated said side portion;

said main member including an outside surface, an inside surface and a medial portion, said medial portion being positioned between said outside surface and said inside surface;

said medial portion of said main member being made of an material that provides insulation;

each said side portion having wheel depressions, each said wheel depression being positioned adjacent said back portion, each said depression also being position adjacent said bottom portion wherein said wheel depressions are aligned with each other across said main member;

said main member having an axle bore, said axle bore extending from an inside surface of one said wheel depression to an inside surface of the other said wheel depression;

an axle rod, said axle rod having a length longer than a length of said axle bore, said axle rod further having a diameter slightly less than a diameter of said axle bore, said axle rod being rotatably received in said axle bore;

a pair of wheels, each said wheel being coupled to an associated distal end of said axle rod wherein said main member may be moved by said wheels;

a foot rest, said foot rest extending from said bottom portion of said main member proximate said front portion of said main member, said foot rest further being positioned along a longitudinal axis of said bottom portion of said main member, said foot rest further having a distal end adapted to abut a support surface upon which said foot rest is placed wherein said foot rest and said wheels support said main member when said main member is placed on a support surface;

a pull handle for pulling said main member, said pull handle having a grasping portion, said grasping portion being generally elliptical in shape, said grasping portion further having a first side adapted to facilitate the pulling of said main member;

said pull handle further having a lifting portion, said lifting portion of said pull handle being generally H-shaped, said lifting portion having a first end, said first end of said lifting portion being coupled to a second side of said grasping portion;

said front portion of said main member having a handle depression, said handle depression being adapted to receive said pull handle, said handle depression having a medial axis that is aligned with a medial axis of said front portion of said main member;

said front portion of said main member further having a first connection portion extending out from said handle depression, said first connection portion being positioned adjacent said top portion of said main member, said first connection portion further having a medial axis that is aligned with said medial axis of said handle depression;

said first connection portion having a first connecting bore, said first connecting bore extending through a length of said first connection portion;

a first connecting rod, said first connecting rod having a length that is longer than a length of said first connecting bore, said first connecting rod further having a diameter slightly less than a diameter of said first connecting bore, said first connecting rod being rotatably received in said first connecting bore;

said lifting portion of said pull handle having a second end, said second end including a pair of parallel front arms, said first connecting rod being coupled between said front arms wherein said pull handle may rotate about said first connection portion, said pull handle having a use position and a storage position, said use position being defined when said pull handle is rotated away from said front portion of said main member, said storage position being defined when said pull handle is positioned in said handle depression;

said lifting portion of said pull handle including a carrying bar for allowing a user to lift said front portion of said main member, said carrying bar extending across said front arms of said lifting portion at a predetermined distance from said first connection portion;

a second connection portion, said second connection portion extending from said back portion of said main member, said second connection portion being positioned adjacent said top portion of said main member, said second connection portion further having a medial axis aligned with a medial axis of said back portion;

said second connection portion having a second connecting bore, said second connecting bore extending through a length of said second connection portion;

a second connecting rod, said second connecting rod having a length longer than a length of said second connecting bore in said second connection portion, said second connecting rod having a diameter slightly less than a diameter of said second connecting bore in said second connection portion, said second connecting rod being rotatably received in said second connecting bore;

a generally U-shaped back carrying handle for allowing a user to lift the back portion of said main member, said back carrying handle including a pair of parallel back arms, said second connecting rod being coupled between said back arms wherein a user may carry said main member by said carrying bar of said lifting portion of said pull handle and said back carrying handle; and said top portion of said main member being adapted to extend over said second connection portion.

\* \* \* \* \*